June 14, 1949.   C. J. MEYER   2,472,953
TRACTOR DRAWN HAY RAKE
Filed Aug. 20, 1946
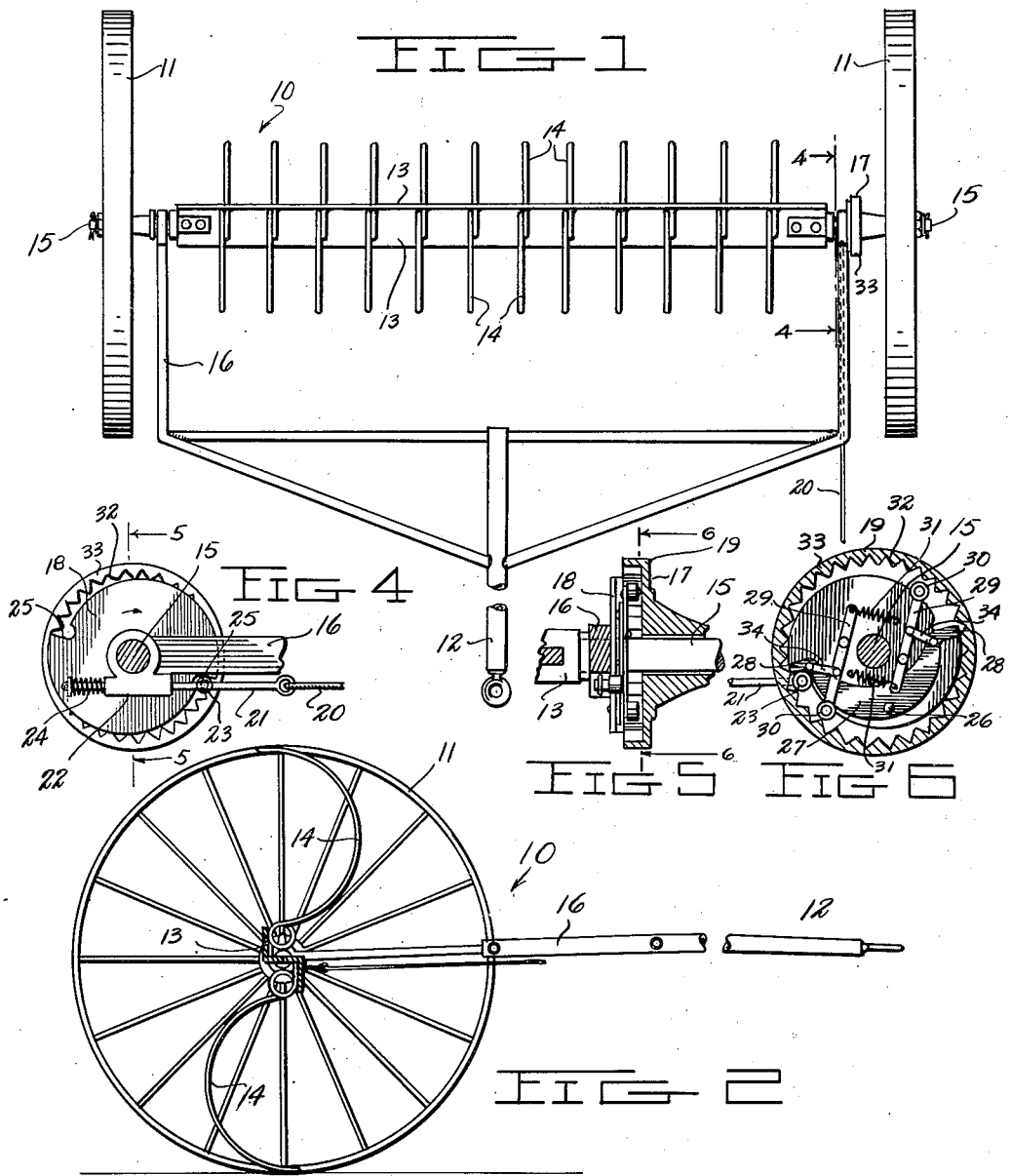
Inventor
Chester J. Meyer
By
Attorneys Patented June 14, 1949

2,472,953

UNITED STATES PATENT OFFICE 2,472,953

TRACTOR DRAWN HAY RAKE

Chester J. Meyer, Speed, Kans.

Application August 20, 1946, Serial No. 691,720

3 Claims. (Cl. 56—391)

The present invention relates to wheeled hay rakes and is more particularly concerned with a tractor drawn rake.

The primary object of the invention is to provide a dump rake which can be drawn by a tractor and operated at tractor speed.

Another object of the invention is to provide a tractor drawn rake which can be dumped at will by the tractor operator without leaving his seat.

A further object of the invention is to provide a device of the character referred to of simpler and more compact construction than prior devices.

With the foregoing and other objects and advantages in view the invention consists of the novel construction and arrangement of parts hereinafter described and claimed.

In the accompanying drawings illustrating the invention,

Figure 1 is a top plan view of the rake.

Figure 2 is a vertical longitudinal section thereof.

Figure 3 is a fragmentary longitudinal section illustrating the embodiment of the novel features in a rubber tire rake.

Figure 4 is a section on line 4—4 of Figure 1.

Figure 5 is a section on line 5—5 of Figure 4.

Figure 6 is a section on line 6—6 of Figure 5.

Like numerals, as used in the description and drawings, designate the same parts of construction.

10 is a conventional type of dump rake with traction wheels 11 and a hitch 12 to couple to an ordinary farm tractor. The wheels may be of ordinary metal tread type, as illustrated in Figures 1 and 2, or rubber tired, as illustrated in Figure 3.

In this device a floating axle 13 is employed. In cross-section the shape thereof is substantially like a Z in reverse.

The semi-circular rake teeth 14 are attached to the intermediate web of this axle so that the flanges thereof will serve as back braces. The teeth are arranged in two diametrically-opposed rows.

Secured to each end of the axle and aligned coaxially are studs or spindles 15 on which the wheels 11 are mounted revolvably.

The draft frame 16 of the rake is mounted freely on the spindles 15 and associated with the left wheel is a clutch 17 of novel construction which serves to rotate the floating axle 13 in a 180 degree arc to dump the rakes, as desired. One of the clutch members 18 is bolted on the axle spindle while the other member 19 is mounted on the wheel hub or formed integrally therewith. Both members are spaced suitably and in coaxial alignment. The fixed relation of clutch member 18 and axle is designed to position the two sets of rake teeth in proper position for raking purposes.

The clutch plate 18 is normally out of engagement with the opposing clutch plate 19. To throw them into engagement and dump the loaded rake, a pull cable 20 is attached to the clutch assembly and operable from the seat of the tractor.

The rear end of the cable is attached to a reciprocable trip rod 21 mounted in a tubular bracket 22 depending from the frame 16 contiguous to spindle 15. It carries a roller 23 in advance of the bracket and is normally retracted by a coil spring 24 mounted on a projecting extension in the rear of the bracket.

The clutch member 18 is provided with diametrically opposed cam faces having shoulders 25 in diametric apposition. These cam shoulders are normally engaged by the roller 23 to lock the floating shaft. By pulling the roller forward momentarily the shaft is free to rotate one-half cycle before the released roller is engaged by the opposite shoulder 25.

Mounted on the inner face of the cam member 18 by a central pivot pin 26 is an arcuate rocker arm 27 with lateral shoulders 28, in diametric apposition and designed to limit movement thereof by engaging roller 23 which extends inwardly and beyond the cam member sufficiently for the purpose. When said roller is in contact with a shoulder of the cam it also contacts a shoulder of the rocker arm, as both shoulders are in horizontal alignment. In this, the locked position, the rake teeth are immobile.

Pivotally mounted on this face of the cam member also, are two opposite levers 29, suitably spaced apart and arranged on opposite sides of the spindle 15. The outer ends of said levers carry rollers 30 while the other ends are attached to retractile coil springs 31. The pivots of the levers are positioned intermediate their ends and at a suitable distance from the springs, to throw the rollers serving as detents into engagement with gear teeth 32 on the inner face of a peripheral flange 33 on member 19. Pivoted links 34 connect the levers 29 to the rocker arm contiguous to the shoulders of the latter.

When it is desirable to throw the said clutch members into engagement and the trip rod 21 is pulled, the roller 23 thereon is freed from engagement with the shoulder 25 of the cam for sufficient time to disengage same, also to relieve its pressure on the rocker arm, thereby allowing the springs to throw the said detents 29 into engagement with gear 33 and interlock the clutch members. These remain in engagement and revolve clockwise, thereby rotating the axle clockwise. In the momentary pause between pull on trip rod 21 and release thereof, the rotation of the cam places its high point on the left of roller 23.

When the member 19 has revolved a half cycle, the roller 23 seats on the succeeding shoulder of the cam and also is engaged by the other shoulder 28 of the rocker arm, thereby releasing said detents. At such time the member 19 will rotate idly. The foregoing action lifts the rake on the ground to a position above the axle and brings the other, or raised, rake down in a forward motion to operative position. When this occurs the clutch members automatically become separated.

As different embodiments may be made of this inventive concept and modifications may be made in the embodiment hereinbefore shown and described, it will be understood that the matter herein is to be interpreted as illustrative merely and not in a limiting sense.

What I claim is:

1. In a hay rake, a frame, a transverse axle revolubly mounted on said frame, ground engaging wheels journalled on opposite ends of said axle, two diametrically opposed sets of rake teeth pivoted to said axle on axes parallel to and on opposite sides of the axis of said axle, stop means on said axle limiting gravitational swing of said rake teeth to arcs less than a semi-circle, and clutch means arranged coaxially with respect to said axle and one of said ground engaging wheels and operatively connecting said one ground engaging wheel with said axle to turn said axle only one-half revolution upon each complete revolution of said one ground engaging wheel, said clutch means comprising a clutch plate fixed coaxially on said axle having a pair of similar diametrically opposed peripheral cam surfaces terminating at one end in radial stop surfaces, an operating element mounted on said axle for endwise movement in a direction tangential to said axle and spring retracted to normally occupy a position at one end of the travel of said operating element, a lateral cam follower roller on said operating element rollably engaging one of said cam surfaces and in the retracted position of said operating element engaging the stop surface thereof whereby reverse rotation of said clutch plate and said axle are prevented, a rocker pivoted intermediate its ends on the outboard side of said clutch plate at a point eccentric with respect to the axis of said clutch plate, said rocker having diametrically opposed shoulders projecting outwardly therefrom into the path of said operating element roller whereby one of said shoulders is engaged by said roller while said roller is engaged with a stop surface of said clutch plate, a pair of diagonal levers pivoted intermediate their ends on the outboard side of said clutch plate at diametrically opposite points, said levers occupying generally parallel positions and having detent rollers on their outer ends and spring means connected to their inward ends whereby their rollers are urged outwardly of the periphery of said clutch plate, links pivoted at their opposite ends to and operatively extending between points adjacent to the said shoulders on said rocker and points on said levers between the lever pivotal points and their detent rollers, said clutch means further comprising a clutch rotor fixed coaxially on said one ground engaging wheel and having a ring gear with its teeth surrounding said clutch plate, said spring means urging said detent rollers toward engagement with the ring gear teeth, endwise movement of said operating element away from said retracted position acting to withdraw said cam follower roller from engagement with said stop surface and with the related rocker shoulder in a manner to free said clutch plate and said axle to rotate relative to the ground engaging wheel and said rocker to rock relative to said clutch plate until said cam follower is engaged by the other stop surface of said clutch plate and the other shoulder of said rocker, the freeing of said clutch plate, axle, and rocker permitting said spring means to engage said detent rollers with said ring gear teeth whereby said ground engaging wheel and said axle are connected for rotation together, and engagement of said cam follower with said other clutch plate stop surface and said other rocker shoulder acting to pivot said rocker relative to said clutch plate in a direction to retract said levers against the resistance of said spring means and thereby withdraw said detent rollers from said ring gear teeth, so as to disconnect said ground engaging wheel from said axle and lock said axle against rotating relative to said frame.

2. In a hay rake, a frame, a transverse axle revolubly mounted on said frame, ground-engaging wheels journaled on opposite ends of said axle, two diametrically-opposed sets of rake teeth pivoted to said axle on axes parallel to and on opposite sides of the axis of said axle, stop means on said axle limiting gravitational swing of said rake teeth to arcs less than a semi-circle, and clutch means arranged co-axially with respect to said axle and one of said ground-engaging wheels and operatively connecting said one ground-engaging wheel with said axle to return said axle only one-half revolution upon each complete revolution of said one ground-engaging wheel, said clutch means comprising a clutch plate fixed co-axially on said axle having a pair of similar diametrically-opposed peripheral cam surfaces terminating at one end in radial stop surfaces, an operating element mounted on said axle for endwise movement in a direction tangential to said axle and spring retracted to normally occupy a position at one end of the travel of said operating element, a lateral cam follower roller on said operating element rollably engaging one of said cam surfaces and in the retracted position of said operating element engaging the stop surface thereof whereby reverse rotation of said clutch plate and said axle are prevented, a rocker pivoted intermediate its ends on the outboard side of said clutch plate at a point eccentric with respect to the axis of said clutch plate and provided with means engaging said follower roller for limiting movement of said clutch plate, a pair of diagonal levers pivoted intermediate their ends on the outboard side of said clutch plate at diametrically-opposite points and operatively connected to said rocker, a clutch rotor fixed coaxially on said one ground-engaging wheel and having a ring gear with its teeth surrounding said clutch plate, said levers occupying general parallel positions and having detent rollers on their opposite ends and spring means connected to their inward ends, said spring means urging said detent rollers toward engagement with the ring gear teeth.

3. In a hay rake, a frame, a transverse axle revolubly mounted on said frame, ground-engaging wheels journaled on opposite ends of said axle, two diametrically-opposed sets of rake teeth pivoted to said axle on axes parallel to and on opposite sides of the axis of the said axle, stop means on said axle limiting gravitational swing of said rake teeth to arcs less than a semi-circle, and clutch means arranged co-axially with respect to said axle and one of said ground-engaging wheels and operatively connecting said one ground-engaging wheel with said axle to turn said axle only one-half revolution upon each complete revolution of said one ground-engaging wheel, said clutch means comprising a clutch plate fixed co-axially on said axle having a pair of similar diametrically-opposed peripheral cam surfaces terminating at one end in radial stop surfaces, an operating element mounted on said axle for endwise movement in a direction tangential to said axle and spring retracted to normally occupy a position at one end of the travel of said operating element, a lateral cam follower roller on said operating element rollably engaging one of said cam surfaces and in the retracted position of said operating element engaging the stop surface thereof whereby reverse rotation of said clutch plate and said axle are prevented, a rocker pivoted intermediate its ends on the outboard side of said clutch plate at a point eccentric with respect to the axis of said clutch plate, said rocker having diametrically-opposed shoulders projecting outwardly therefrom into the path of said operating element roller whereby one of said shoulders is engaged by said roller while said roller is engaged with the stop surface of said clutch plate, a pair of diagonal levers pivoted intermediate their ends on the outboard side of said clutch plate at diametrically-opposite points and operatively connected to said rocker, and a clutch rotor fixed co-axially on said one ground-engaging wheel and having a ring gear with its teeth surrounding said clutch plate, said levers occupying generally parallel positions and having detent rollers on their outer ends and spring means connected to their inward ends, said spring means urging said detent rollers toward engagement with the ring gear teeth.

CHESTER MEYER.

REFERENCES CITED

The following references are of record in the file of this patent:

UNITED STATES PATENTS

| Number | Name | Date |
|--------|------|------|
| 87,982 | Spangler | Mar. 16, 1869 |
| 1,812,035 | Carlson | June 20, 1931 |